United States Patent [19]

Flax

[11] 4,441,368
[45] Apr. 10, 1984

[54] METHOD AND MEANS FOR DETERMINING ULTRASONIC WAVE ATTENUATION IN TISSUE

[75] Inventor: Stephen W. Flax, Waukesha, Wis.

[73] Assignee: General Electric Company, Rancho Cordova, Calif.

[21] Appl. No.: 369,423

[22] Filed: Apr. 19, 1982

[51] Int. Cl.³ ............................................. A61B 10/00
[52] U.S. Cl. ...................................... 73/599; 128/660
[58] Field of Search ................................. 128/660-663, 128/731, 599

[56] References Cited

U.S. PATENT DOCUMENTS 3,896,788  7/1975  Sato ...................................... 128/663
4,254,779  3/1981  Miyato et al. ........................ 128/731

OTHER PUBLICATIONS

Cohen, B. A. et al., "Stationority of the Human Electroencephalogram", MBEC vol. 15, 1977, pp. 513-518.

Primary Examiner—Kyle L. Howell
Assistant Examiner—Francis J. Jaworski
Attorney, Agent, or Firm—Flehr, Hohbach, Test, Albritton & Herbert

[57] ABSTRACT

Ultrasonic wave attenuation in an object is determined from the number of zero crossings of a reflected signal as a function of depth. The zero crossing density is indicative of the frequency spectrum, and by comparing the zero crossing density at one level to the zero crossing density at a second level a measure of attenuation therebetween is obtained. Apparatus for implementing the method comprises a zero crossing detector such as a Schmitt triggered monostable multivibrator and a pulse counter.

9 Claims, 8 Drawing Figures

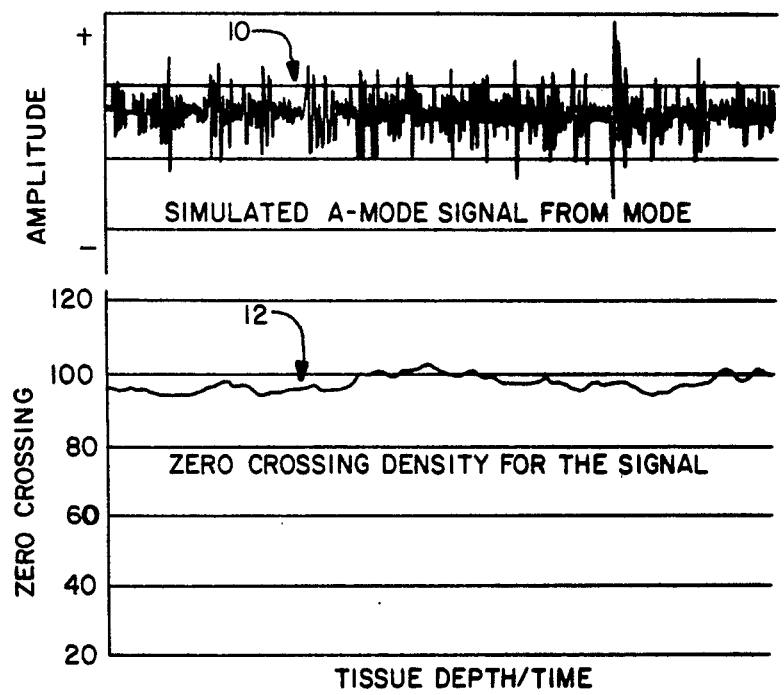
FIG.—1
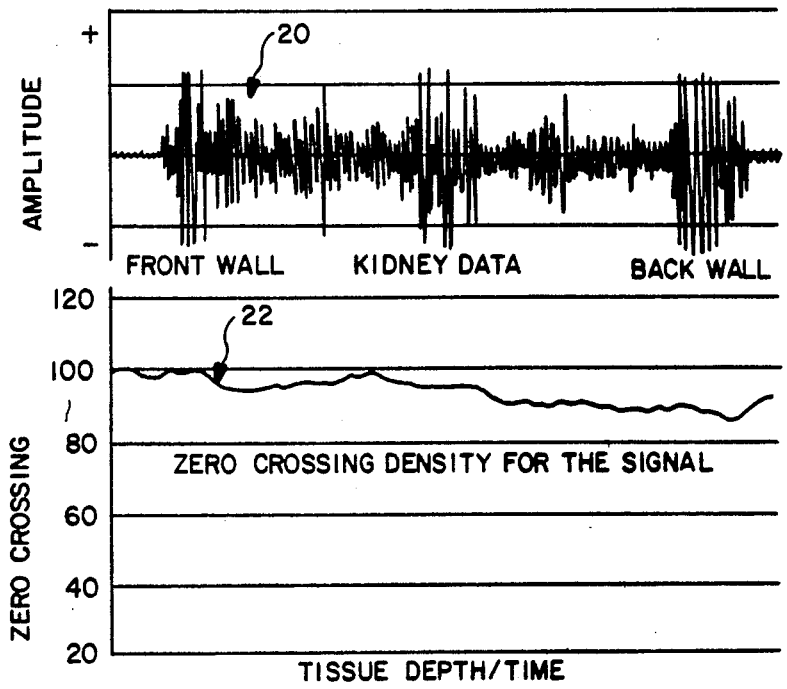
FIG.—2

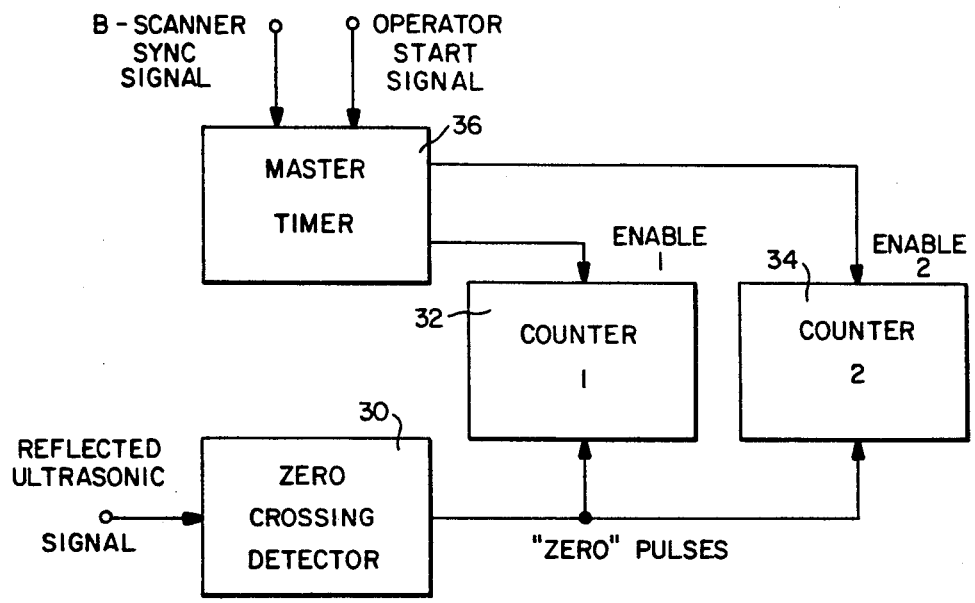
FIG.—3
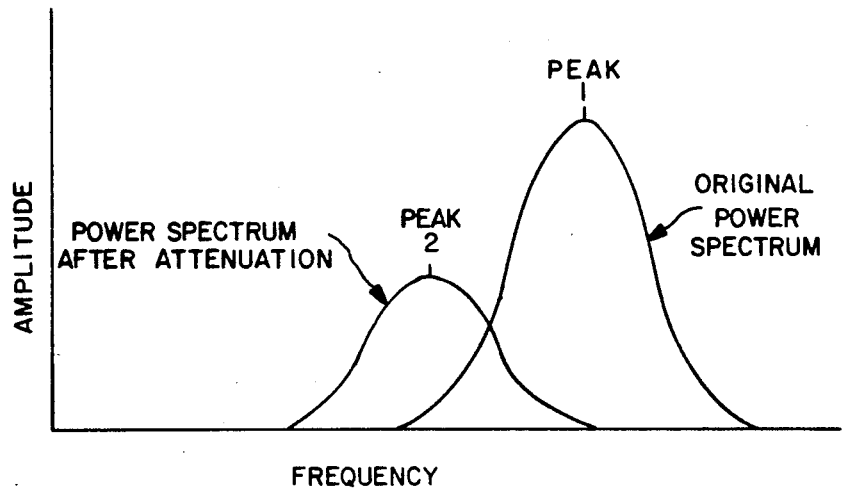
FIG.—4

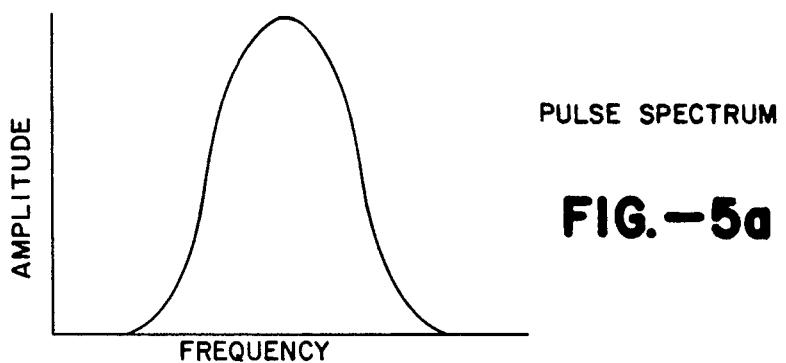
PULSE SPECTRUM
FIG.—5a
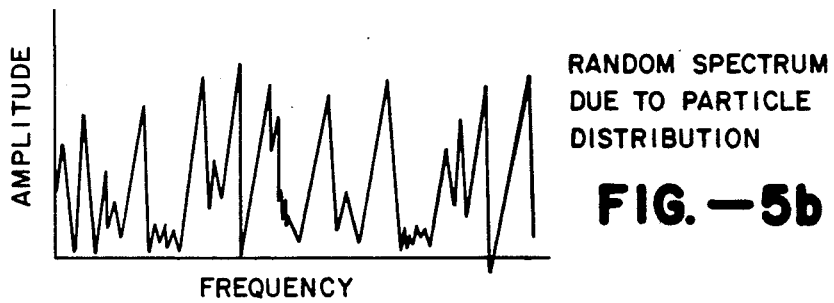
RANDOM SPECTRUM DUE TO PARTICLE DISTRIBUTION
FIG.—5b
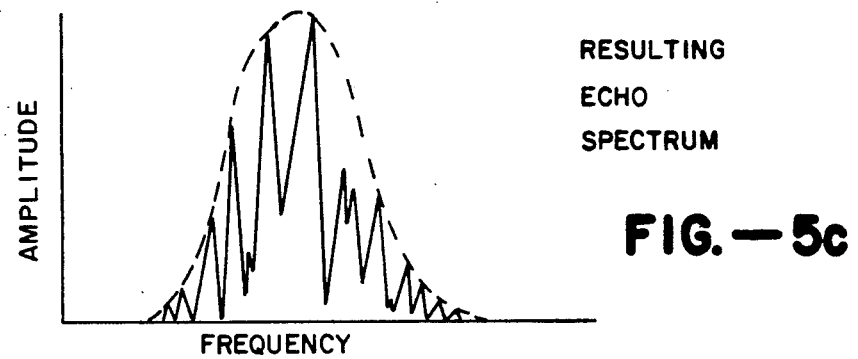
RESULTING ECHO SPECTRUM
FIG.—5c
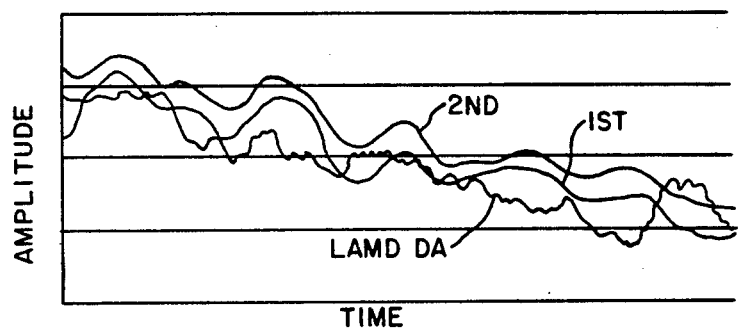
FIG.—6

METHOD AND MEANS FOR DETERMINING ULTRASONIC WAVE ATTENUATION IN TISSUE

This invention relates generally to ultrasonic diagnostic system, and more particularly the invention relates to a method and means for determining frequency dependent ultrasonic wave attenuation in tissue by time domain analysis.

Ultrasonic diagnostic systems are known and commercially available for medical diagnostic purposes. See for example U.S. Pat. No. 4,172,386 for "Video A-Trace Display System for Ultrasonic Diagnostic System" and U.S. Pat. No. 4,204,433 for "Computerized Ultrasonic Scanner with Technique Select". The commercially available Datason ultrasound system of General Electric Company provides both real time and static images on a television display.

Briefly, such systems utilize sound transducers to transmit ultrasonic waves (e.g. on the order of several megahertz) into a patient and to receive reflected signals. By analyzing the reflected signals a quantitative assessment of physical tissue parameters can be obtained. Such parameters include frequency dependent signal attenuation, time of flight, signal scatter and refractive effects. While medical diagnosis through ultrasound signal analysis has been successful, physiological variations and sample error problems limit the accuracy of the measurements.

Tissue attenuation of ultrasonic energy in the range of one to ten megahertz is found to be approximately a linear function of frequency and depth and is normally expressed dimensionally in db's/cm/mhz. Different tissues and different lesions within a given tissue tend to have different attenuation coefficients, thus each can be characterized by determining this coefficient.

Heretofore, the attenuation coefficient has been usually measured directly by obtaining a signal sample at two different depths within the tissue and then taking and comparing the Fourier transform of the signals. Theoretically, the frequency dependence of the attenuation function is obtained by dividing one spectrum by the other. In practice, however, the spectrum obtained from the tissue scatter produces a noisy spectrum, and the spectrum or frequency shift is usually estimated. Further, the spectral estimates are difficult to make since if a sample is too short the spectral resolution is limited and if the sample is too long a spectral smearing occurs since the spectrum is changing with depth. Thus, the frequency dependent attenuation coefficient for tissue has been a limited and difficult measurement.

An object of the present invention is an improved method of determining frequency dependent coefficient of attenuation of ultrasonic energy in tissue.

Another object of the invention is apparatus for use in determining tissue attenuation coefficients which is simple, reliable, and inexpensive.

A feature of the invention is the use of zero crossings of a reflected signal in a region for predicting the signal frequency spectrum in the region.

Briefly, in accordance with the invention frequency domain characteristics of a wave are determined from an analysis of temporal features of the wave. The temporal features are detected and a histogram thereof is established. The histogram can then be correlated to the frequency domain characteristics. For example, a histogram of zero crossings is correlated to the second moment in the frequency domain, and a histogram of wave maxima per unit of time is correlated to the fourth moment in the frequency domain.

In accordance with one embodiment of the invention a method of predicting the frequency dependent attenuation in tissue comprises the steps of transmitting an ultrasonic signal into the tissue, receiving a reflected signal, and determining the number of zero crossings of the reflected signal as a function of depth in the tissue. By comparing the number of zero crossings at one depth to the number of zero crossing at a second depth a measure of attenuation in the tissue between the first depth and the second depth is obtained.

Apparatus for determining the number of zero crossings in the reflected ultrasonic signal comprises a monostable multivibrator having an input and an output, means for receiving the reflected ultrasonic wave and triggering the monostable multivibrator, and means connected to the output for measuring the output pulses of the monostable multivibrator. In a preferred embodiment the trigger comprises a Schmitt trigger circuit and the means for measuring the output pulses comprises charge storage means. Thus, the accumulated charge in the reflected signal from the first depth is subtracted from the measure of accumulated charge of the reflected signal at the second depth to determine frequency dependent attenuation of the tissue between the first and second depth.

The invention and objects and features thereof will be more readily apparent from the following detailed description and appended claims when taken with the drawing, in which:

FIG. 1 is a plot of a simulated reflected ultrasonic signal of tissue and the zero crossing density for the signal versus sample depth.

FIG. 2 is an actual plot of a reflected ultrasonic signal from an animal kidney and the zero crossing density for the reflected signal versus depth in the kidney.

FIG. 3 is a schematic of circuitry for counting zero crossings and determining frequency dependent attenuation in accordance with the invention.

FIG. 4 is a plot of signal power spectra versus frequency.

FIGS. 5a–5c are plots of frequency spectra of a pulse, noise, and a reflected signal versus frequency.

FIG. 6 is a plot of frequency spectra moments and zero crossing data for an ultrasonic signal.

Referring now to the drawings, FIG. 1 is a plot of a computer simulated ultrasonic signal as may be reflected by human tissue and the zero crossing density of the signal as a function of tissue depth. The signal shown generally at 10 is a complex waveform which varies with depth in the tissue thus indicating the randomness in the tissue scatter. Below the simulated ultrasonic wave is a plot of the zero crossings density of the complex wave at various depths in the tissue. From the curve 12 it is seen that the zero crossing density varies approximately 90 to 105 at the various depths. However, the mean value is constant, indicating no net change in the expected density of zero crossings.

FIG. 2 is a similar plot of an actual reflected ultrasonic signal from the kidney of an animal showing attenuation of the signal from the front wall to the back wall. Again, the zero crossing density curve 22 varies from approximately 85 to slightly above 100 from the back wall to the front wall of a kidney. Now, however, there appears to be an average decrease in zero crossings per time as a function of depth.

As above described, the zero crossing density of the reflected ultransonic wave is an indicia of the frequency spectrum of the reflected wave at different levels in the tissue. Thus, in accordance with the invention the frequency dependent attenuation of an ultrasonic signal of the tissue between first and second levels in the tissue can be readily determined by comparing the zero crossing density at the first level to the zero crossing density at the second level. Determining the actual spectral resolution of the reflected ultrasonic wave, and the attendant difficulties associated therewith, is obviated.

FIG. 3 is a functional block diagram of apparatus in accordance with the invention for implementing the measurement of zero crossing density. The reflected ultrasonic signal is applied to a zero crossing detector 30 which preferably comprises a monostable multivibrator having a Schmitt trigger. Such a circuit is commercially available, for example, the TI 74221 dual one shot with Schmitt trigger input. The output of the zero crossing detector 30 is a series of pulses from the multivibrator with the number of pulses being indicative of the number of zero crossings of the reflected ultrasonic signal. The pulses are connected to first and second counters 32 and 34 which are enabled to count the number of zero crossings during an interval of time corresponding to reflected signals from tissue at first and second depths in the tissue. The counters may be capacitive charge storage means which develop a charge indicative of number of pulses. Alternatively, each counter can be a conventional pulse counter. The time periods for enabling counters 32 and 34 are established by a master timer 36 which responds to an operator start signal and the sync signal from an ultrasonic B- scanner such as the Datason system. The sync system indicates the beginning of transmission of an ultrasonic signal into the patient. The enable signals to counters 32 and 34 are then based on the time of flight of ultrasonic waves in the tissue. Accordingly, counter 32 is enabled to count pulses during the time period that the reflected ultrasonic signal is received from a first depth in the tissue, and counter 34 is enabled to count pulses during the time period of the reflected ultrasonic signals from a second depth in the tissue.

The theoretical relationship of the attenuation coefficient of tissue to the zero crossing density of the returned ultrasonic signal is based on the theoretical relationships described by S. O. Rice in "Mathematical Analysis of Random Noise", Bell System.Technical Journal 23, 24, Pages 1–162, 1944 and 1945 and Dines and Kak, "Ultrasonic Attenuation Tomography of Soft Tissues", *Ultrasonic Imaging*, Vol. 1, No. 1, Pages 16–33, 1979. According to the Dines and Kak paper if the spectrum of an ultrasonic pulse is Gaussian in shape then frequency selective attenuation will merely produce a downward translation of the spectrum with depth, leaving the spectral shape unchanged. This is shown in FIG. 4 as follows. Assuming a signal power spectrum of $$x(f) = a_0 e^{-(f-f_0)^2/2\sigma^2} \quad (1)$$

and an attenuation term $$a(f) = e^{-\alpha_0 f l} \quad (2)$$

where $a_o$ is an amplitude constant, $f$=frequency, $f_o$=center frequency of the spectrum, $\alpha_o$ the relative attenuation, and $l$=the propagation path length. It should be noted that equation 2 makes the assumption the attenuation is linearly related to frequency. While this is true for tissue, the invention is not limited to linear dependence of frequency on attenuation. The resulting signal spectrum is the product of 1 and 2.

Hence, $$S(f) = a(f) \cdot x(f)$$
$$= a_0 e^{-\alpha_0 f l} e^{-(f-f_0)^2/2\sigma^2}$$
$$= a_0 e^{-[f^2 - 2ff_0 + 2\alpha_0\sigma^2 fl + f_0^2]/2\sigma^2}$$

The center of this spectrum can be found by finding the minimum of the term being exponentiated. Therefore, taking the derivative with respect to f and setting it equal to 0, one obtains $$d[f^2 - 2ff_0 + 2\sigma^2\alpha_0 fl + f_0^2] = 2f - 2f_0 + 2\sigma^2\alpha_0 l = 0$$

or $$f_{peak} = f_0 - (\sigma^2 \alpha_0 l)$$

It is seen that the peak of the Gaussian spectrum simply slides linearly toward lower frequencies as a function of $\alpha_o$ and $l$. Since the spectral shape is constant, a good estimate of $\alpha_o$ can be obtained simply by finding the center of the Gaussian shape.

If it is assumed that the pulse is propagating through a random inhomogeneous medium such as tissue, the energy from the pulse will be scattered at random. Mathematically this is equivalent to convolving the pulse with a series of random impulses. In the frequency domain it will then be equivalent to multiplying the spectrum S(f) by a random noise power spectrum. Hence one will get the Gaussian envelope modulated by Noise. This is shown in FIGS. 5a–5c. There no longer will be a "clear" Gaussian function to work with but rather one must estimate where the center is with a statistical evaluation. One obvious method would be to look for the first moment or "mean" of the spectrum as a good approximation to the center of the Gaussian shape. Mathematically this is:

$$\text{First Moment} = \frac{\int_0^\infty f S(f) df}{\int_0^\infty S(f) df}$$

Now, from Rice's work, the average zero crossings density per time for a band limited signal is estimated by the square root of second moment of the power density spectrum. Hence $$\lambda \approx 2 \cdot \left[ \frac{\int_0^\infty f^2 S(f) df}{\int_0^\infty S(f) df} \right]^{\frac{1}{2}}$$

For spectral functions not close to the origin it can be shown qualitatively that the square root of the second moment is approximately equal to the first moment. Thus, $$\lambda \approx 2 \cdot \left[ \frac{\int_0^\infty f^2 S(f) df}{\int_0^\infty S(f) df} \right]^{\frac{1}{2}} \approx f_{peak} = f_0 - (a_0 \sigma^2 l)$$

or $\lambda$ is proportional to $(a_o l)$

An example of this can be shown using an A-mode digitized waveform from a Datason system using an RMI graphite gel phantom. FIG. 6 is a plot comparing the first moment, the square root of the second moment and the zero crossing data. The first and second moments were calculated using Fourier Transform data and the zero crossing data was obtained directly from the A-mode signal. Thus, it is seen that the zero crossing density curve fairly tracks the first and second moment data.

There has been described an improved and simple method and means for determining frequency domain characteristics of a wave by an analysis of temporal features of the wave such as in determining frequency dependent attenuation of an ultrasonic wave in a body. A histogram of zero crossings is indicative of the second moment in the frquency domain, and the number of wave maxima per unit of time is indicative of the fourth moment in the frequency domain. Other histograms such as the distribution of time intervals between zeros can be employed. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of determining the second moment frequency domain characteristics of a reflected ultrasonic wave passed through tissue by time domain analysis comprising the steps of detecting zero crossings of said wave, and comparing the detected zero crossings during one interval of time corresponding to a first tissue depth with the detected zero crossings during a second period of time corresponding to a second tissue depth thereby determining the change in the second moment frequency domain characteristics of said wave between the two depths.

2. A method of predicting the frequency dependent attenuation in tissue comprising the steps of
transmitting an ultrasonic signal to the tissue,
receiving a reflected signal,
determining the number of zero crossings of said reflected signal at a first depth in the tissue and at a second depth in the tissue, and
comparing the measure of zero crossings at the first depth to the measure of zero crossings at the second depth to obtain a measure of the ultrasonic wave attenuation in the tissue between said first depth and said second depth.

3. The method as defined by claim 2 wherein said step of comparing includes subtracting the measure of zero crossings at the first depth from the measure of zero crossings at the second depth.

4. Apparatus for use in determining the second moment frequency domain characteristics of a reflected ultrasonic signal passed through tissue comprising a monostable multivibrator having a trigger input and a pulse output, means for receiving said reflected ultrasonic wave and applying a trigger signal to the input of said monostable multivibrator, and means connected with said output for measuring the output pulses from said monostable multivibrator during two separate time periods corresponding to reflected ultrasonic signals from first and second depths in tissue.

5. Apparatus as defined by claim 4 wherein said means for applying a trigger signal comprises a Schmitt trigger circuit.

6. Apparatus as defined by claim 4 or 5 wherein said means for measuring output pulses comprises first and second charge storage means for measuring the output pulses at two levels in said tissue.

7. A method of detecting frequency domain moments of a reflected ultrasonic wave transmitted through tissue by time domain analysis comprising the steps of identifying a repetitive feature of the time domain wave, establishing a histogram of said repetitive feature including time domain characteristics during at least two different periods of time corresponding to different depths in the tissue, and correlating said histogram to a frequency domain moment.

8. The method as defined by claim 7 wherein said feature is zero crossings.

9. The method as defined by claim 7 wherein said feature is wave maxima.

* * * * *